(12) United States Patent
Engler et al.

(10) Patent No.: US 10,579,499 B2
(45) Date of Patent: Mar. 3, 2020

(54) TASK LATENCY DEBUGGING IN SYMMETRIC MULTIPROCESSING COMPUTER SYSTEMS

(71) Applicant: International Business Machines Corporation, Armonk, NY (US)

(72) Inventors: Eberhard Engler, Tuebingen (DE); Christian Jacobi, West Park, NY (US); Timothy J. Slegel, Staatsburg, NY (US); Scott B. Swaney, Germantown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 15/478,379

(22) Filed: Apr. 4, 2017

(65) Prior Publication Data
US 2018/0285147 A1 Oct. 4, 2018

(51) Int. Cl.
*G06F 9/44* (2018.01)
*G06F 11/36* (2006.01)
*G06F 11/07* (2006.01)

(52) U.S. Cl.
CPC ........ *G06F 11/362* (2013.01); *G06F 11/0715* (2013.01); *G06F 11/0757* (2013.01); *G06F 11/0778* (2013.01); *G06F 2201/81* (2013.01)

(58) Field of Classification Search
CPC ........................... G06F 11/0757; G06F 11/362
USPC .......................................... 718/107; 717/124
See application file for complete search history.

(56) References Cited

U.S. PATENT DOCUMENTS

| | | | | |
|---|---|---|---|---|
| 6,466,898 B1* | 10/2002 | Chan | ............ | G06F 17/5022 703/14 |
| 6,496,881 B1* | 12/2002 | Green | ............ | G06F 1/24 710/58 |
| 6,662,216 B1* | 12/2003 | Arimilli | ............ | G06F 11/349 709/218 |
| 6,779,125 B1* | 8/2004 | Haban | ............ | H03K 3/356113 327/157 |
| 7,010,722 B2* | 3/2006 | Jahnke | ............ | G06F 11/2242 324/750.3 |

(Continued)

OTHER PUBLICATIONS

"A Model for Systematic Monitoring and Debugging of Starvation Bugs in Multicore Software"; Sara Abbaspour, Mehrdad Saadatmand, Sigrid Eldh, Daniel Sundmark, Hans Hansson. SCTDCP'16, Sep. 3, 2016, Singapore.*

*Primary Examiner* — Francisco J Aponte
(74) *Attorney, Agent, or Firm* — Cantor Colburn LLP; William Kinnaman

(57) ABSTRACT

An aspect includes performing, for each of a plurality of hardware threads executing on a plurality of cores in a (SMP) computer system, receiving a value of a timer corresponding to the hardware thread, the timer counting a number of clock cycles since a last reset of the timer. The value of the timer is compared to a threshold value for the hardware thread, where the threshold value specifies a number of clock cycles. Based on the value of the timer meeting the threshold value, a control signal is sent to cause all hardware threads currently executing on the core to halt execution and data describing a state of the core is logged. Each of the timers corresponding to each of the plurality of hardware threads are configured to be reset, paused, and restarted independently of each of the other timers.

17 Claims, 5 Drawing Sheets

(56) References Cited

U.S. PATENT DOCUMENTS

| | | | |
|---|---|---|---|
| 7,080,283 B1* | 7/2006 | Songer | G06F 11/3636 714/30 |
| 7,162,666 B2* | 1/2007 | Bono | G06F 11/0757 714/23 |
| 7,222,270 B2* | 5/2007 | Meaney | G06F 11/0772 714/41 |
| 7,424,666 B2* | 9/2008 | Chandwani | G06F 11/0724 714/799 |
| 7,761,687 B2* | 7/2010 | Blumrich | G06F 15/17337 712/11 |
| 7,966,536 B2* | 6/2011 | Ludewig | G06F 11/0778 714/25 |
| 7,996,715 B2* | 8/2011 | Rebmann | G06F 9/544 714/13 |
| 8,145,884 B2* | 3/2012 | Kissell | G06F 8/4442 712/215 |
| 8,145,887 B2* | 3/2012 | Le | G06F 9/30032 712/207 |
| 8,230,177 B2* | 7/2012 | Luttrell | G06F 9/383 711/137 |
| 8,407,528 B2 | 3/2013 | Larson | |
| 8,595,554 B2* | 11/2013 | Bellofatto | G06F 11/2242 714/27 |
| 9,195,462 B2* | 11/2015 | Xu | G06F 9/3851 |
| 9,223,677 B2* | 12/2015 | Swaine | G06F 11/3636 |
| 9,710,427 B2* | 7/2017 | Goryachev | G06F 9/5077 |
| 10,061,671 B2* | 8/2018 | LaVine | G06F 11/25 |
| 10,114,729 B2* | 10/2018 | Baartmans | G06F 9/466 |
| 10,223,186 B2* | 3/2019 | Hollaway, Jr. | G06F 11/0778 |
| 2004/0201939 A1* | 10/2004 | Shipton | B41J 2/04505 361/104 |
| 2004/0216003 A1* | 10/2004 | Floyd | G06F 11/0727 714/25 |
| 2005/0102673 A1 | 5/2005 | Dewitt, Jr. et al. | |
| 2005/0177633 A1* | 8/2005 | Plunkett | B41J 2/04505 709/225 |
| 2006/0184840 A1* | 8/2006 | Floyd | G06F 11/0724 714/48 |
| 2007/0092048 A1 | 4/2007 | Chelstrom et al. | |
| 2007/0220513 A1 | 9/2007 | Hwang | |
| 2007/0245110 A1* | 10/2007 | Shibayama | G06F 3/0605 711/165 |
| 2008/0177756 A1* | 7/2008 | Kosche | G06F 11/3447 |
| 2008/0235454 A1* | 9/2008 | Duron | G06F 11/1064 711/128 |
| 2009/0158012 A1* | 6/2009 | Hansen | G06F 9/30 712/222 |
| 2009/0259899 A1* | 10/2009 | Ludewig | G06F 11/0778 714/726 |
| 2009/0271592 A1* | 10/2009 | Jensen | G06F 7/5055 712/214 |
| 2010/0058095 A1* | 3/2010 | Malek | G06F 1/12 713/375 |
| 2010/0058101 A1* | 3/2010 | Shahid | G06F 1/12 713/500 |
| 2010/0235558 A1* | 9/2010 | Snead | G06F 11/0724 710/267 |
| 2010/0318774 A1* | 12/2010 | Abts | G06F 11/0721 712/234 |
| 2011/0107310 A1* | 5/2011 | Pont | G06F 11/3644 717/129 |
| 2011/0219208 A1* | 9/2011 | Asaad | G06F 15/76 712/12 |
| 2012/0089861 A1* | 4/2012 | Cardinell | G06F 11/0724 714/2 |
| 2013/0031420 A1* | 1/2013 | Haverkamp | G06F 11/3656 714/45 |
| 2013/0151816 A1 | 6/2013 | Indukuru et al. | |
| 2016/0092327 A1* | 3/2016 | Kang | G06F 11/36 714/33 |
| 2016/0314055 A1 | 10/2016 | Bagchi et al. | |
| 2016/0342493 A1* | 11/2016 | Mahajan | G06F 11/0787 |
| 2018/0217915 A1 | 8/2018 | Wang et al. | |

\* cited by examiner

TASK LATENCY DEBUGGING IN SYMMETRIC MULTIPROCESSING COMPUTER SYSTEMS

BACKGROUND

Embodiments of the invention relate to debugging computers, and more specifically to task latency debugging in symmetric multiprocessing (SMP) computer systems.

SUMMARY

Embodiments include methods, systems, and computer program products for implementing task latency debugging in symmetric multiprocessing (SMP) computer systems. An example method includes performing, for each of a plurality of hardware threads executing on a plurality of cores in a (SMP) computer system, receiving a value of a timer corresponding to the hardware thread, the timer counting a number of clock cycles since a last reset of the timer. The value of the timer is compared to a threshold value for the hardware thread, where the threshold value specifies a number of clock cycles. Based on the value of the timer meeting the threshold value, a control signal is sent to cause all hardware threads currently executing on the core to halt execution and data describing a state of the core is logged. Each of the timers corresponding to each of the plurality of hardware threads are configured to be reset, paused, and restarted independently of each of the other timers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
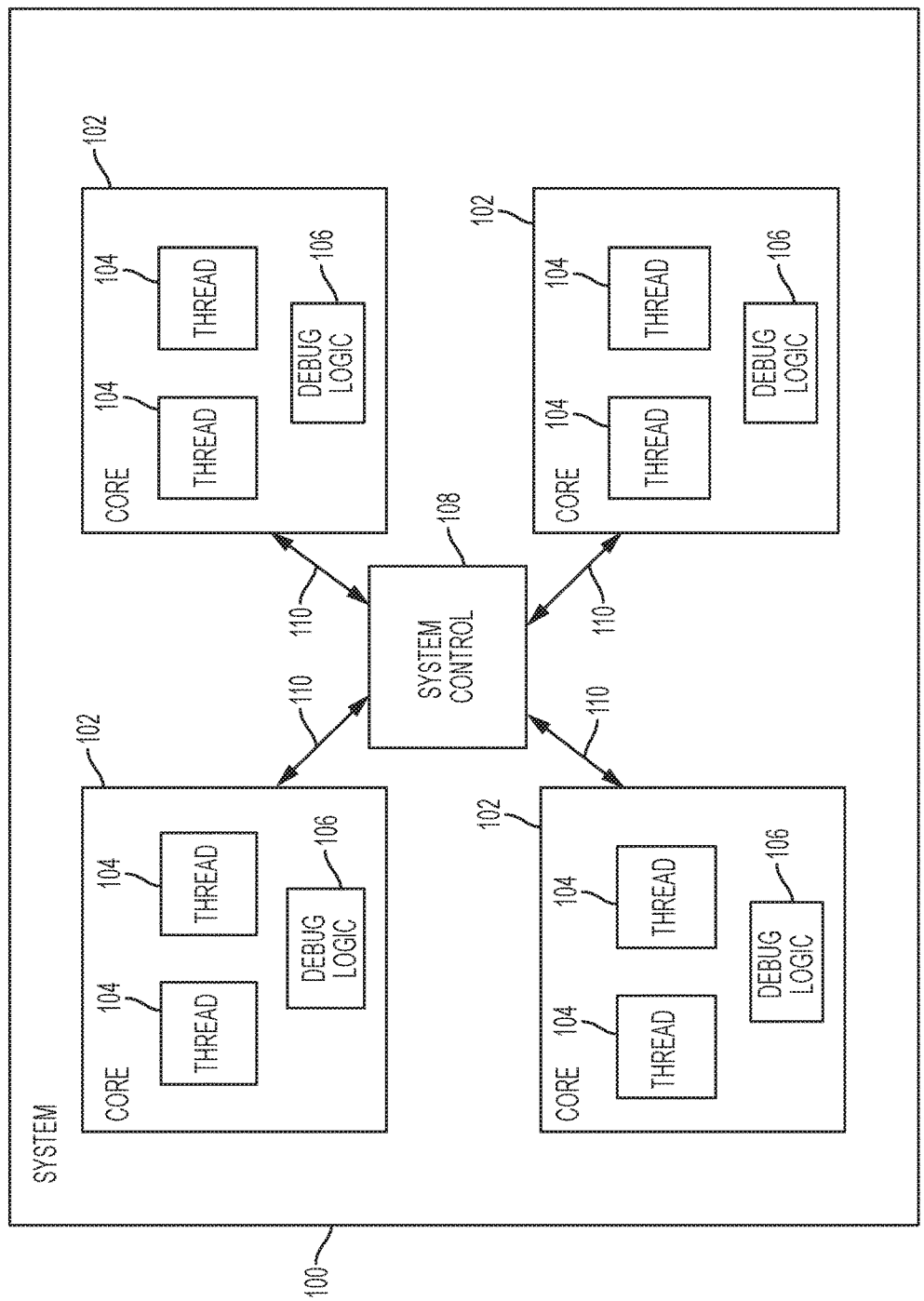
FIG. 1 is a block diagram of a system for implementing task latency debugging in symmetric multiprocessing (SMP) computer systems in accordance with one or more embodiments.

One or more embodiments described herein perform task latency debugging in symmetric multiprocessing (SMP) computer systems by bounding a program execution task and timing its execution without requiring any software or firmware traps. When a programmable delay is exceeded, a checkstop of the entire symmetric multiprocessing (SMP) can be performed while the task is executing. This can allow for the capturing of state data across the SMP at the time that the unexpectedly long delay is occurring. One or more embodiments include a timer for each processing thread, or core, of each central processing unit (CPU); a user-programmable timer threshold; a control to pause or reset or restart the timer independently for each processing thread, a comparator against the threshold; and error checkers. The error checkers can cause recovery, a checkstop of the processor (or core), or a checkstop of the entire SMP computer system. When the checkstop of the entire SMP computer system occurs, current state data of the SMP computer system, including the current operating state and trace arrays operating independently on all processor cores across the SMP are locked, and logged out for analysis. In accordance with one or more embodiments, unbounded program execution tasks with abnormally high latencies are discovered by starting the timer and stopping the entire SMP system if a task execution is too long for firmware to intervene and reset the timer before a user programmable number of clock cycles have elapsed.

In large SMP computer systems a task that normally executes very quickly can occasionally take substantially longer to execute (e.g., twice as long, ten times as long, or multiple orders of magnitude longer). The impact of these situations varies as widely as the situations themselves, and can include but is not limited to: increased or inconsistent response times, overall performance degradation, timeouts and recovery, utilization spikes, and break duplexing. The abnormal execution times may only occur once in a billion passes, but in an SMP computer system with hundreds of processors operating at multi-gigahertz frequencies this can be multiple times every second. Often these situations can be mitigated once they are identified and understood. In addition to future hardware design improvements, software, firmware, and compilers may improve lock management, interrupt affinity and handling, communication protocols, and/or leverage cache-state controlling instructions like prefetch depth (PFD) and next instruction access intent (NIAI) once these exposures are well understood.

One or more embodiments described herein can be utilized to debug and understand the root causes of delays by isolating the abnormal task execution and capturing detailed data across the entire SMP computer system while the situation is occurring, and without requiring specialized firmware traps. This is contrasted with contemporary methods that require firmware taps to be implemented once a problematic task is identified. Firmware times the execution of the task and if it is outside of a defined normal range, then the firmware triggers data collection. A drawback to contemporary approaches is that firmware has to be written and compiled to implement the trap. Another drawback is that without detailed knowledge of exactly where the abnormal execution delay is occurring, by the time firmware can detect the long execution time, the cause of it has already been resolved so it is too late to capture the data to show the root cause. A further drawback to contemporary approaches is that sometimes the trap to time the execution of the task changes the execution flow such that the problem no longer manifests itself in the same way, thus making it impossible to capture or ambiguous.

In accordance with one or more embodiments described herein, a long-delay debug timer (e.g., 18, 36, or 72 bits) is programmable to span from sub-microseconds to tens of seconds. The timer is instructed to pause, count (restart), or reset by logic that is programmable to select various operations of interest. If the timer expires, then it sets an error checker which can trigger a full system checkstop so that debug data, or state data, can be collected from the entire SMP computer system to show what was happening across the entire system at the time that the timer expired. The error checker can also trigger a recovery event to possibly allow circumventions for predetermined situations.

As used herein the term "error checker" refers to a logic circuit which detects an anomalous condition from other logic circuits, including but not limited to incorrect parity, residue, or hamming code, protocol violations, hangs, or other predetermined inconsistencies. As used herein, the term "checkstop" refers to a logic state where processing is immediately stopped due to a signal from an error checker. A checkstop can be applied to an entire system or to a selected core, or processor, in the system. As used herein the term "a recovery signal" refers to a control signal activated by an error checker which invokes a recovery function in an attempt to tolerate an anomalous condition instead of causing an immediate checkstop.

In accordance with one or more embodiments, a typical debug scenario uses an instruction address compare to start the timer, and a second instruction address compare to reset the timer. The addresses can correspond, for example to an address of a first instruction in a subroutine and to an address of a last instruction in the subroutine. Detecting the address of the start of the subroutine can cause the timer to be started, and detecting the address at the end of the subroutine can cause the timer to be reset. The timer threshold can be programmed to be a longer interval than a typical execution of the subroutine. If the subroutine takes longer to execute than the duration that the timer is programmed for, then an error checker is set to, for example, to checkstop the SMP computer system while the subroutine is still executing anomalously, so that system-wide data can be collected to identify what was causing that particular execution of the subroutine to be anomalous. In addition, when long-running operations (stall events) such as quiesce or wait-state are detected, the timer can be paused so that it will only expire on anomalous events not already known about.

By selecting various conditions available for other debug controls, such as trace array start/stop, the long-delay debug timer can be used to capture the machine state for anomalous execution of many different scenarios such as, but not limited to: subroutine execution, coupling messages, interrupt handling, interrupt response time, protocol handshakes from software or firmware, lock management implementation, and/or hot cache-line contention in hardware.

In accordance with one or more embodiments, the timer also has a "time-bomb" mode where the timer free-runs and firmware periodically resets it. If firmware becomes unresponsive for any reason, like a hot-interrupt or quiesce malfunction, the timer will expire (exceed the user programmable threshold) and capture the system-wide data to identify the cause of the unresponsive firmware.

Turning now to FIG. 1, a block diagram of a system 100 for implementing task latency debugging in SMP computer systems is generally shown in accordance with one or more embodiments. The system 100 shown in FIG. 1 includes four cores 102 (also referred to herein as "processors") as well as a system control module 108 for responding to control signals received on a control signal bus 110 from the cores 102. Examples of control signals received from the cores 102 include error checker signals such as checkstop signals and recovery signals. In addition, the system control module 108 can send control signals on the control bus 110 to the cores 102. Examples of control signals sent to the cores 102 from the system control module 108 can include error checker signals as well as notifications of stall events (e.g., interrupt, quiesce). Each core 102 shown in FIG. 1 includes two hardware threads 104 and debug logic 106 to implement the processing described herein. The debug logic 106 can be implemented in hardware and/or software. Embodiments are not limited to the embodiment shown in FIG. 1 as embodiments can be used by SMP computer systems with any number of hardware threads 104 per core 102, and any number of cores 102 per system 100.

As used herein, the term "core" or "processor" refer to an integrated circuit that contains all the functions of a central processing unit of a computer, capable of reading and executing machine instructions for one or more programs. As used herein, the term "hardware thread" or "thread" refers to the reading and execution of instructions by a processor core which are specific to a single program. As used herein, the term "SMP computer system" refers to a plurality of multi-threaded processor cores, caches, memories, and input/output controllers packaged on integrated circuit boards and interconnected such that the caches and memories are coherently shared across all the processor cores and threads in the system. As used herein, the term "millicode" refers to microcode which runs directly on the processor core without a separate microcode processor and includes special instructions which allow access to micro-architecture-specific hardware constructs in the core.

Figure 2:
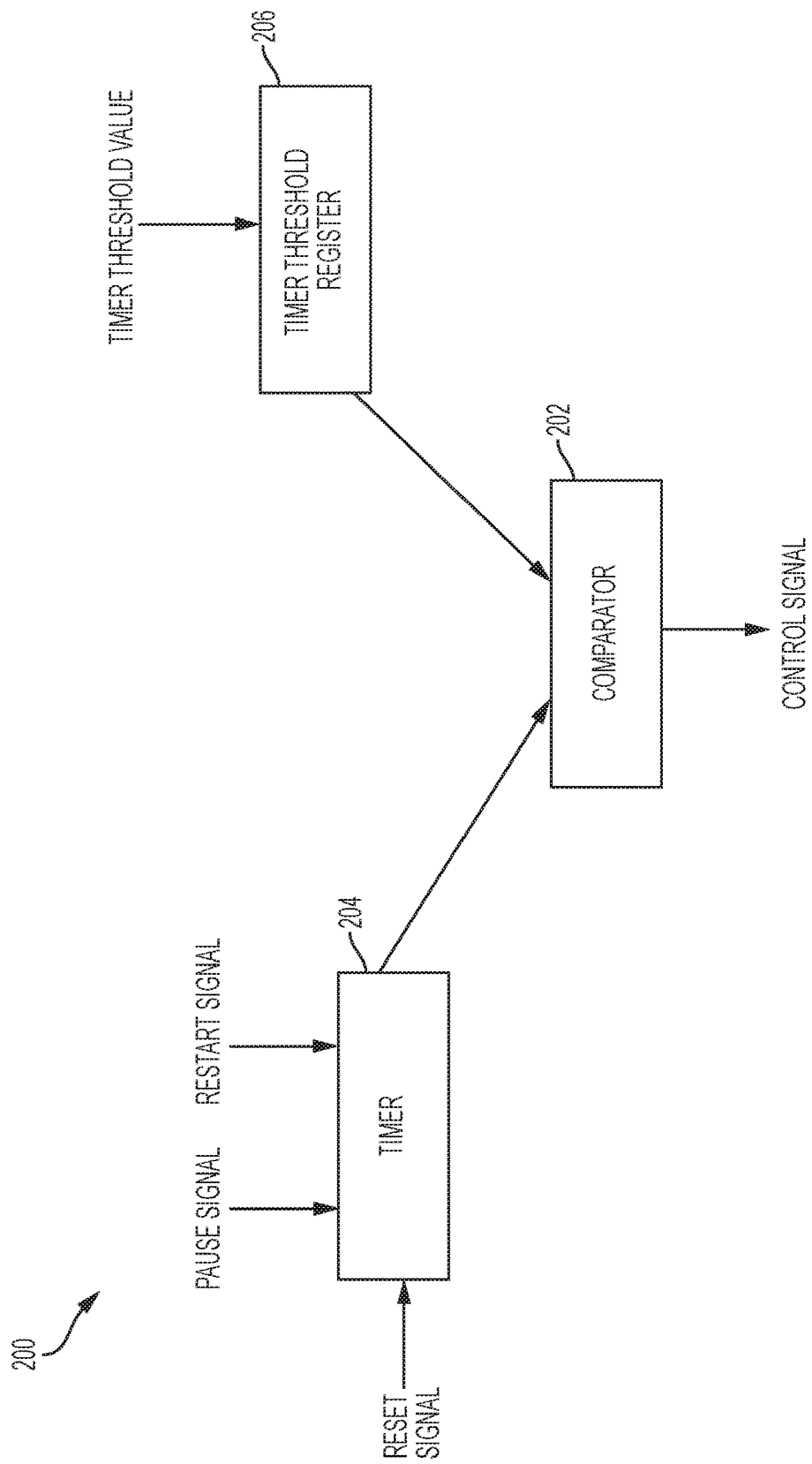
FIG. 2 is a block diagram of debug logic for implementing task latency debugging in SMP computer systems in accordance with one or more embodiments.

Turning now to FIG. 2, a block diagram 200 of debug logic for implementing task latency debugging in SMP computer systems is generally shown in accordance with one or more embodiments. The debug logic shown in FIG. 2 can be implemented by hardware and/or software located on each core in an SMP computer system. FIG. 2 includes a timer 204 for counting cycles, a timer threshold register 206 for storing a timer threshold value, and a comparator 202 for comparing the threshold value stored in the timer threshold register 206 to a current value of the timer 204. The timer 204 is a 36-bit counter which increments by one each machine cycle when started and not paused, holds its current value when paused, or holds at zero when reset.

As shown in FIG. 2, the timer 204 can respond to a reset signal which can reset the timer 204 to zero, a pause signal which can instruct the timer 204 to stop counting cycles, and a restart signal which can instruct the timer 204 to start counting cycles from the value of the timer 204 when it was paused or from zero if it was reset. In accordance with one or more embodiments, the pause signal is under control of millicode and user-selectable predefined hardware states. FIG. 2 also shows the timer threshold value being input to the timer threshold register 206. In accordance with one or more embodiments, the timer threshold value can be modified by a user via a user interface. Based on the results of the comparison, the comparator 202 can output an error checker control signal. For example, based on the value of the timer 204 meeting the threshold value, the control signal can be a checkstop of the entire SMP computer system or of a particular core. Based on the value of the timer 204 not meeting the threshold (e.g. being less than the threshold) the processing of the hardware thread continues.

Copies of the debug logic shown in FIG. 2 can be located on each core of a SMP computer system, with a timer 204, comparator 202, and timer threshold register 206 for each hardware thread executing on the core. At each of the cores and for each of the hardware threads within the cores, a value of a corresponding timer that counts a number of clock cycles since a last reset of the timer is received. The value of the timer is compared to the timer threshold value for the hardware thread. Based on the value of the timer meeting the threshold value, a control signal is sent to cause all hardware threads currently executing on the core to halt execution, and data describing a state of the core is logged. Each of the timers corresponding to each of the plurality of hardware threads are configured to be reset, paused, and restarted independently of each of the other timers.

In accordance with one or more embodiments, when the current value of the timer meets the threshold value, the control signal causes all hardware threads currently executing on the SMP computer system to halt execution, and data describing a state of the SMP computer system is logged.

The data describing a state of the SMP computer system can include, but is not limited to contents of registers, latches, scan ring data, trace arrays, cache controls, and memory subsystem controls. A trace array is part of the state data of a core and refers to a plurality of array memory structures, or buffers, integrated throughout the core hardware design which captures the values of many low-level control signals, across many cycles, which hardware logic designers pre-determine to be useful in debugging the correct operation of the core hardware. The trace array stops capturing new control signal values when an error checker signal is raised so the historical state data is frozen at the time of the error. In accordance with one or more embodiments, a trace array is logged out for analysis as part of the state data of a core or SMP computer system.

One or more embodiments implement an event mode where firmware located on the core resets the timer periodically. For example, when millicode writes to a specified millicode control register (MCR) it resets the timer. If millicode does not write to the MCR within the period of the programmable timeout, the core initiates an error checker, such as a recovery event. This can cause contents of the trace array to be logged and initiate a core or system checkstop. In addition, the resetting of the timer can be performed by millicode executing on a different core anywhere in the SMP computer system.

One or more embodiments implement an instruction completion mode where the timer is reset whenever an instruction (e.g., a non-millimode instruction) completes on the hardware thread. The timer can also be paused in response to detecting a stall event and restarted when the stall event has been completed.

Figure 3:
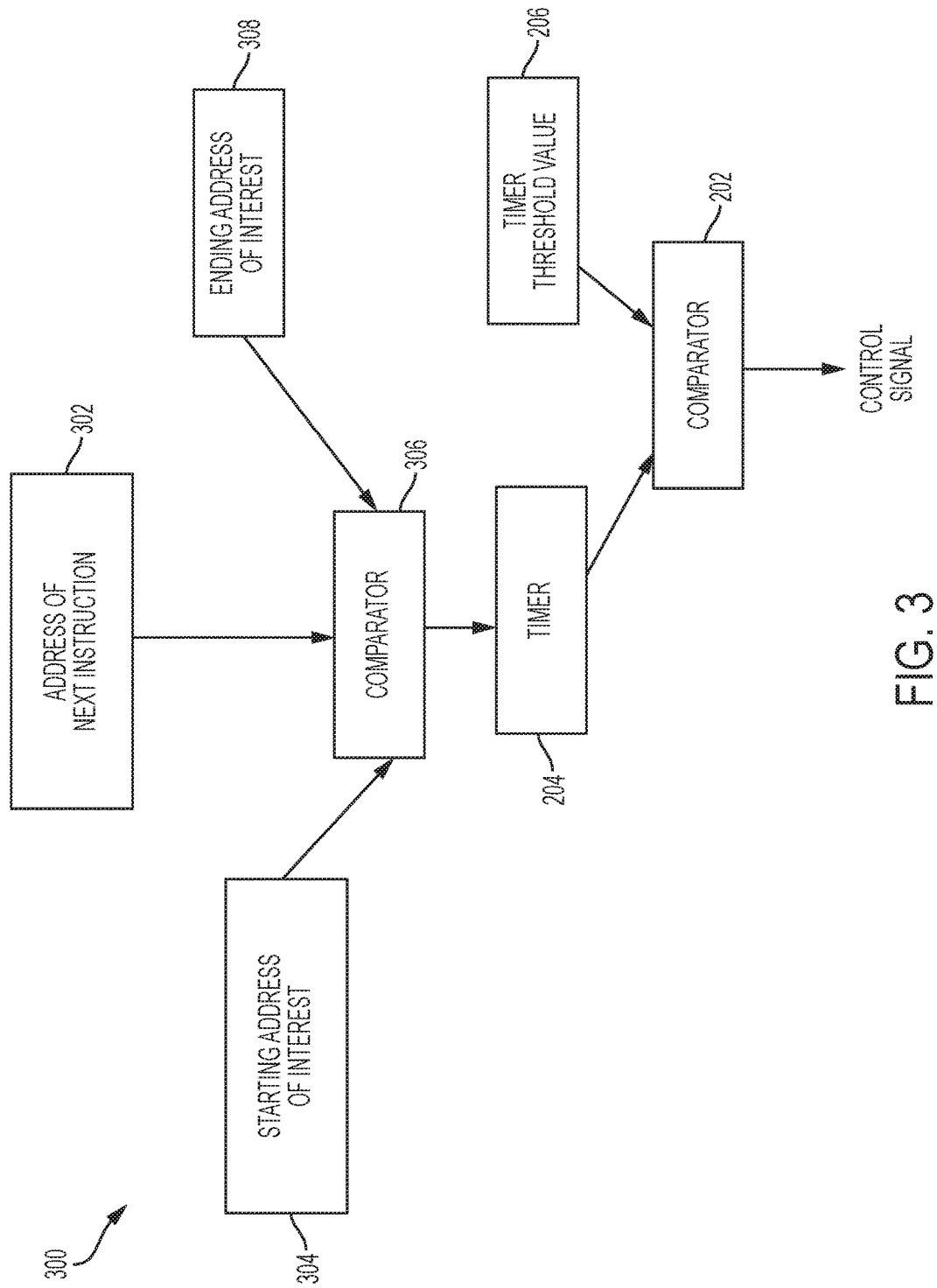
FIG. 3 is a block diagram of debug logic for implementing task latency debugging in SMP computer systems for a selected address range in accordance with one or more embodiments.

Turning now to FIG. 3, a block diagram 300 of debug logic for implementing task latency debugging in SMP computer systems for a bounded instruction address range is generally shown in accordance with one or more embodiments. The debug logic shown in FIG. 3 is similar to the debug logic in FIG. 2 with the addition of a comparator 306 for comparing a starting address of interest 304 and an ending address of interest 308 to an address of a next instruction. The timer 204 is restarted (or initially started if the first time) when the address of the next instruction 302 is the same as the starting address of interest 304. The timer 204 is reset to zero and stopped when the address of the next instruction 302 is the same as the ending address of interest 308. The embodiment shown in FIG. 3 can be used to diagnose causes of long running portions of code by specifying an address range of interest and a threshold number of cycles for completion of the instructions in the address range. The addresses range of interest and the threshold number of cycles are user programmable via a user interface.

Figure 4:
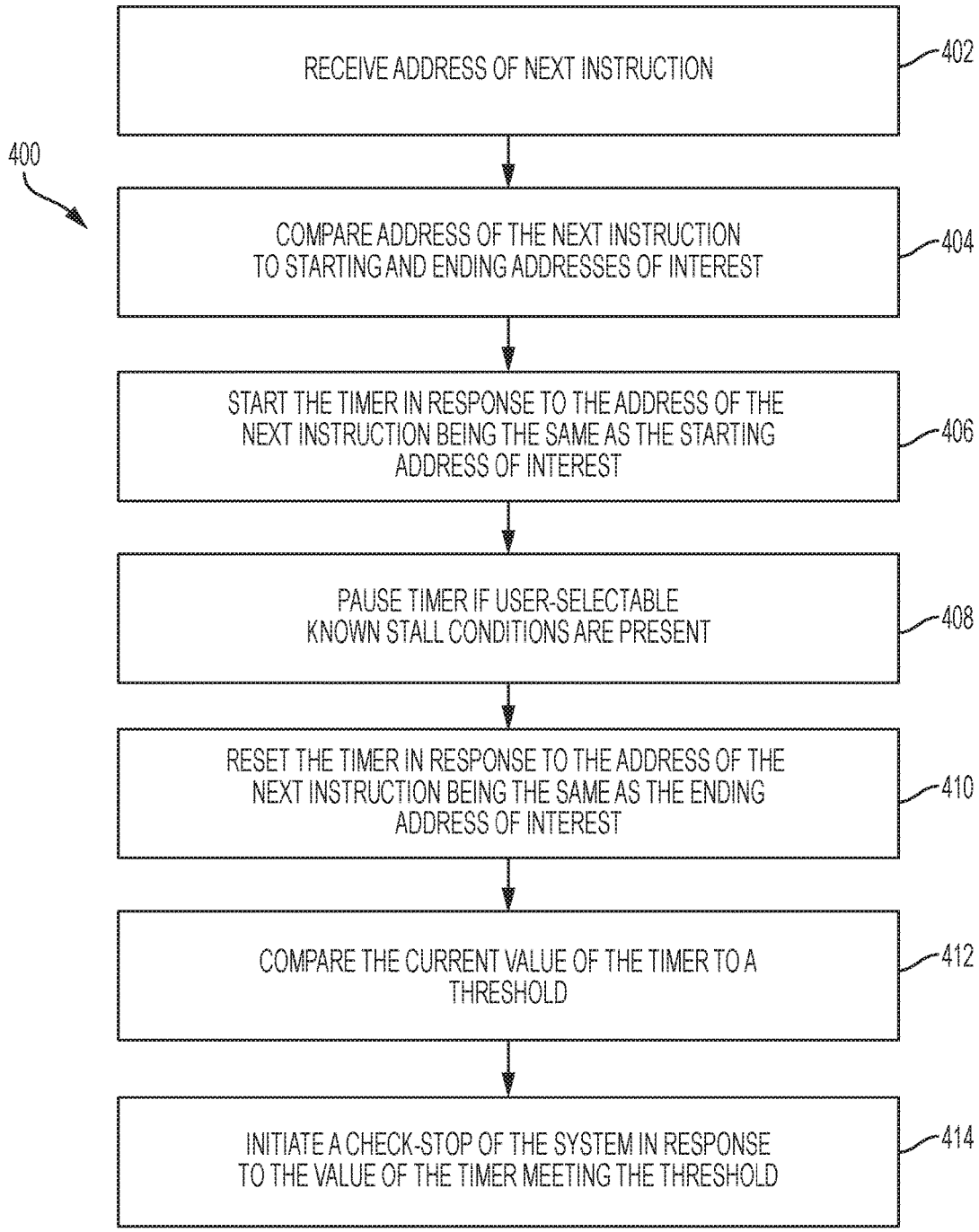
FIG. 4 is a flow diagram of a process for implementing task latency debugging in SMP computer systems for a selected address range in accordance with one or more embodiments.

Turning now to FIG. 4, a flow diagram 400 of a process for implementing task latency debugging in SMP computer systems for a selected address range is generally shown in accordance with one or more embodiments. The processing showing in FIG. 4 can be implemented by debug logic, such as debug logic 300, located on a core processor, such as core 102. The process shown in FIG. 4 can be used to detect causes of long running portions of code within an address range of interest. At block 402, an address of a next instruction to be executed is received and the address of the next instruction to be executed is compared at block 404 to starting and ending addresses of interest. In accordance with one more embodiments, the starting and ending addresses of interest define a code segment, such as a program or a subroutine or other segment. At block 406, the timer is started when the address of the next instruction is the same as the starting address of interest. At block 408, the timer is paused if any user-selected known stall conditions are present, otherwise the timer continues counting. At block 410, the timer is reset when the address of the next instruction is the same as the ending address of interest. At block 412, the current value of the time is compared to a threshold. At block 414, an error checker, such as checkstop of the system, is initiated in response to the value of the timer meeting the threshold. Data describing a state of the system can be logged and accessed by a user via a user interface.

Figure 5:
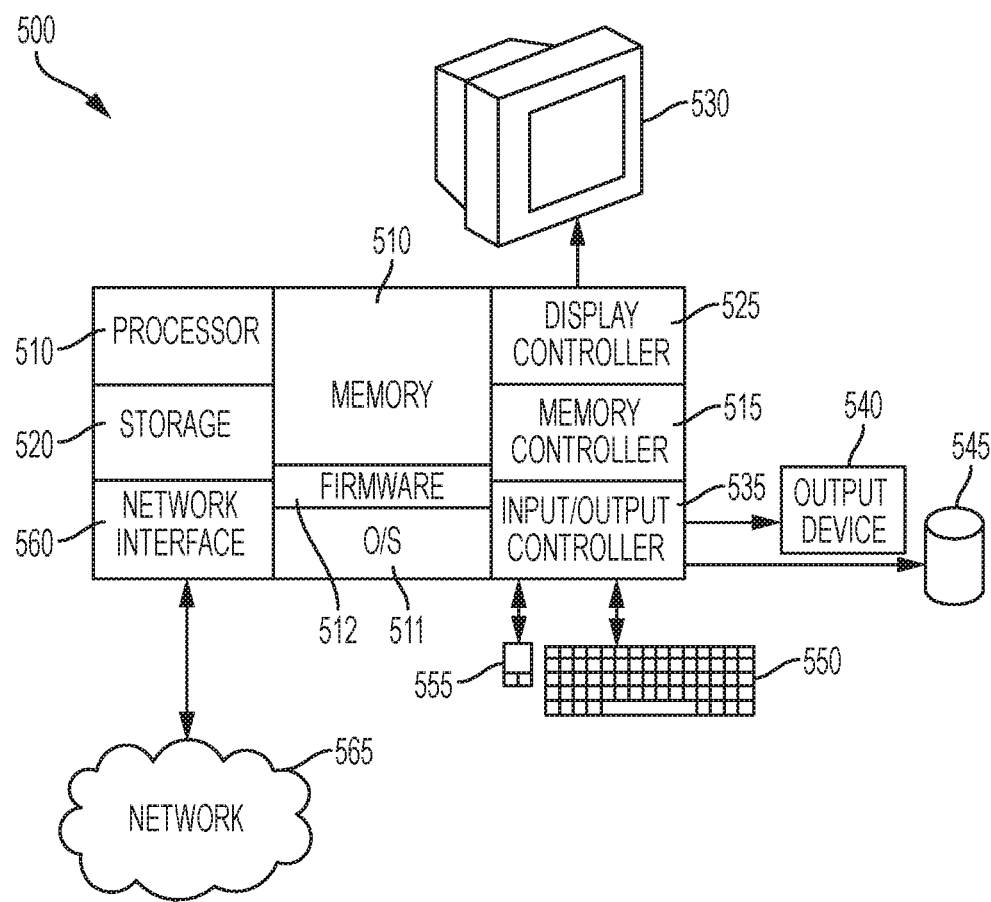
FIG. 5 is a block diagram of a computing device for implementing task latency debugging in SMP computer systems in accordance with one or more embodiments.

Turning now to FIG. 5, a block diagram of a computer system 500 for use in implementing some or all aspects of a system for task latency debugging in SMP computer systems is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The memory 510 may also include firmware 512 which can include, but is not limited to microcode, millicode, and hypervisor code.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for task latency debugging in symmetric multiprocessing (SMP) computer systems as described herein can be embodied, in whole or in part, in computer program products or in computer systems 500, such as that illustrated in FIG. 5.

Technical effects and benefits include the ability to isolate abnormal (e.g., long-running) task execution and to capture detailed data across an entire SMP while the situation is occurring without requiring specialized firmware traps.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   for each of a plurality of hardware threads executing on a plurality of cores in a symmetric multiprocessing (SMP) computer system:
   receiving a value of a timer corresponding to the hardware thread, the timer counting a number of clock cycles since a last reset of the timer;
   comparing the value of the timer to a threshold value for the hardware thread, the threshold value specifying a number of clock cycles; and
   based on the value of the timer meeting the threshold value:
   sending a control signal to cause all hardware threads currently executing on the core to halt execution; and
   logging data describing a state of the core,
   wherein each of the timers corresponding to each of the plurality of hardware threads are configured to be reset, paused, and restarted independently of each of the other timers; and
   the method further comprises for each of the plurality of hardware threads, prior to receiving the value of the timer:
   determining an address of a next instruction to be executed on the hardware thread;
   comparing the address of the next instruction to a starting address of interest;
   resuming the timer based on the address of the next instruction being the same as the starting address of interest;

comparing the address of the next instruction to an ending address of interest; and
resetting the timer based on the address of the next instruction being the same as the ending address of interest.

2. The method of claim 1, further comprising, based on the value of the timer meeting the threshold value:
sending a control signal to cause all hardware threads currently executing on the SMP computer system to halt execution; and
logging data describing a state of the SMP computer system including the state of the core.

3. The method of claim 1, wherein firmware located on the core resets the timer periodically.

4. The method of claim 1, wherein the timer is reset in response to an instruction executing on the hardware thread completing.

5. The method of claim 1, further comprising:
pausing the timer in response to detecting a stall event; and
restarting the timer in response to detecting that the stall event has completed.

6. The method of claim 1, further comprising restarting execution of the halted hardware thread on the core in response to the logging completing.

7. A system comprising:
a memory having computer readable instructions; and
one or more processors for executing the computer readable instructions, the computer readable instructions controlling the one or more processors to perform operations comprising:
for each of a plurality of hardware threads executing on a plurality of cores in a symmetric multiprocessing (SMP) computer system:
receiving a value of a timer corresponding to the hardware thread, the timer counting a number of clock cycles since a last reset of the timer;
comparing the value of the timer to a threshold value for the hardware thread, the threshold value specifying a number of clock cycles; and
based on the value of the timer meeting the threshold value:
sending a control signal to cause all hardware threads currently executing on the core to halt execution; and
logging data describing a state of the core,
wherein each of the timers corresponding to each of the plurality of hardware threads are configured to be reset, paused, and restarted independently of each of the other timers; and
the method further comprises for each of the plurality of hardware threads, prior to receiving the value of the timer:
determining an address of a next instruction to be executed on the hardware thread;
comparing the address of the next instruction to a starting address of interest;
resuming the timer based on the address of the next instruction being the same as the starting address of interest;
comparing the address of the next instruction to an ending address of interest; and
resetting the timer based on the address of the next instruction being the same as the ending address of interest.

8. The system of claim 7, wherein the operations further comprise, based on the value of the timer meeting the threshold value:
sending a control signal to cause all hardware threads currently executing on the SMP computer system to halt execution; and
logging data describing a state of the SMP computer system including the state of the core.

9. The system of claim 7, wherein firmware located on the core resets the timer periodically.

10. The system of claim 7, wherein the timer is reset in response to an instruction executing on the hardware thread completing.

11. The system of claim 7, wherein the operations further comprise:
pausing the timer in response to detecting a stall event; and
restarting the timer in response to detecting that the stall event has completed.

12. The system of claim 7, wherein the operations further comprise restarting execution of the halted hardware thread on the core in response to the logging completing.

13. A computer program product comprising a computer readable storage medium having program instructions embodied therewith, the program instructions executable by a processor to cause the processor to perform operations comprising:
for each of a plurality of hardware threads executing on a plurality of cores in a symmetric multiprocessing (SMP) computer system:
receiving a value of a timer corresponding to the hardware thread, the timer counting a number of clock cycles since a last reset of the timer;
comparing the value of the timer to a threshold value for the hardware thread, the threshold value specifying a number of clock cycles; and
based on the value of the timer meeting the threshold value:
sending a control signal to cause all hardware threads currently executing on the core to halt execution; and
logging data describing a state of the core,
wherein each of the timers corresponding to each of the plurality of hardware threads are configured to be reset, paused, and restarted independently of each of the other timers; and
the method further comprises for each of the plurality of hardware threads, prior to receiving the value of the timer:
determining an address of a next instruction to be executed on the hardware thread;
comparing the address of the next instruction to a starting address of interest;
resuming the timer based on the address of the next instruction being the same as the starting address of interest;
comparing the address of the next instruction to an ending address of interest; and
resetting the timer based on the address of the next instruction being the same as the ending address of interest.

14. The computer program product of claim 13, wherein the operations further comprise, based on the value of the timer meeting the threshold value:
sending a control signal to cause all hardware threads currently executing on the SMP computer system to halt execution; and logging data describing a state of the SMP computer system including the state of the core.

15. The computer program product of claim 13, wherein firmware located on the core resets the timer periodically.

16. The computer program product of claim 13, wherein the timer is reset in response to an instruction executing on the hardware thread completing.

17. The computer program product of claim 13, wherein the operations further comprise:
   pausing the timer in response to detecting a stall event; and
   restarting the timer in response to detecting that the stall event has completed.

* * * * *